United States Patent
Giers

(10) Patent No.: US 6,410,993 B1
(45) Date of Patent: Jun. 25, 2002

(54) CIRCUIT CONFIGURATION FOR A MOTOR VEHICLE CONTROL SYSTEM

(75) Inventor: Bernhard Giers, Frankfurt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/403,876

(22) PCT Filed: Feb. 18, 1998

(86) PCT No.: PCT/EP98/00922

§ 371 (c)(1),
(2), (4) Date: Mar. 6, 2000

(87) PCT Pub. No.: WO98/49038

PCT Pub. Date: Nov. 5, 1998

(30) Foreign Application Priority Data

Apr. 28, 1997 (DE) .......................... 197 17 686

(51) Int. Cl.⁷ .................................. B60L 1/00
(52) U.S. Cl. ......................... 307/10.1; 303/20
(58) Field of Search ........................ 307/10.1; 701/71; 303/122.05, 122.08, 20, 22.4; 700/79

(56) References Cited

U.S. PATENT DOCUMENTS

| | | | |
|---|---|---|---|
| 4,546,437 A | | 10/1985 | Bleckmann et al. |
| 4,913,249 A | * | 4/1990 | Lang .................... 180/404 |
| 5,074,626 A | * | 12/1991 | Kramer et al. ......... 303/122.04 |
| 5,490,072 A | * | 2/1996 | Hornback .................... 700/79 |
| 5,526,264 A | * | 6/1996 | Niggemann et al. ... 303/122.05 |
| 5,684,702 A | * | 11/1997 | Phillips et al. ......... 303/122.11 |
| 5,713,643 A | * | 2/1998 | Esselbrugge et al. .. 303/122.08 |
| 5,752,748 A | * | 5/1998 | Schramm et al. ............. 303/20 |
| 5,795,039 A | * | 8/1998 | Fennel ................... 303/122.05 |
| 5,862,502 A | * | 1/1999 | Giers ......................... 701/71 |
| 6,299,261 B1 | * | 10/2001 | Weiberle et al. ....... 303/122.04 |

FOREIGN PATENT DOCUMENTS

| | | |
|---|---|---|
| DE | 30 24 370 | 1/1982 |
| DE | 35 25 455 | 1/1984 |
| DE | 32 34 637 | 3/1984 |
| DE | 37 31 142 | 4/1988 |
| DE | 37 25 750 | 2/1989 |
| DE | 38 25 280 | 2/1990 |
| DE | 41 01 598 | 8/1991 |
| DE | 41 22 016 | 1/1993 |
| DE | 41 24 987 | 1/1993 |
| DE | 41 37 124 | 5/1993 |
| DE | 42 01 577 | 7/1993 |
| DE | 42 12 337 | 10/1993 |
| DE | 43 39 570 | 5/1995 |
| DE | 43 41 082 | 6/1995 |
| DE | 195 09 150 | 9/1996 |
| DE | 195 29 434 | 2/1997 |
| DE | 196 07 429 | 9/1997 |
| DE | 196 31 309 | 2/1998 |

OTHER PUBLICATIONS

Search Report of the German Patent Office for Application No. 197 17 686.0.

* cited by examiner

*Primary Examiner*—Josie Ballato
*Assistant Examiner*—Sharon Polk
(74) *Attorney, Agent, or Firm*—Rader, Fishman & Grauer PLLC

(57) ABSTRACT

A circuit arrangement for a safety-critical control system, such as ABS, TCS, ASMS, brake-by-wire, etc., has a dual-circuit or multiple-circuit design, and each circuit includes a complete microprocessor system that processes the input data redundantly and delivers an error identification signal (FAIL) when an error or a discrepancy between the redundantly produced data processing results occurs. Upon error detection, there is a transition to an emergency operation mode where either a circuit is disconnected or the actuator activation of both circuits is assumed by the intact microprocessor system. Each of the two systems is equipped with peripherals of its own, comprised of signal detection, actuator activation, and energy supply.

8 Claims, 1 Drawing Sheet

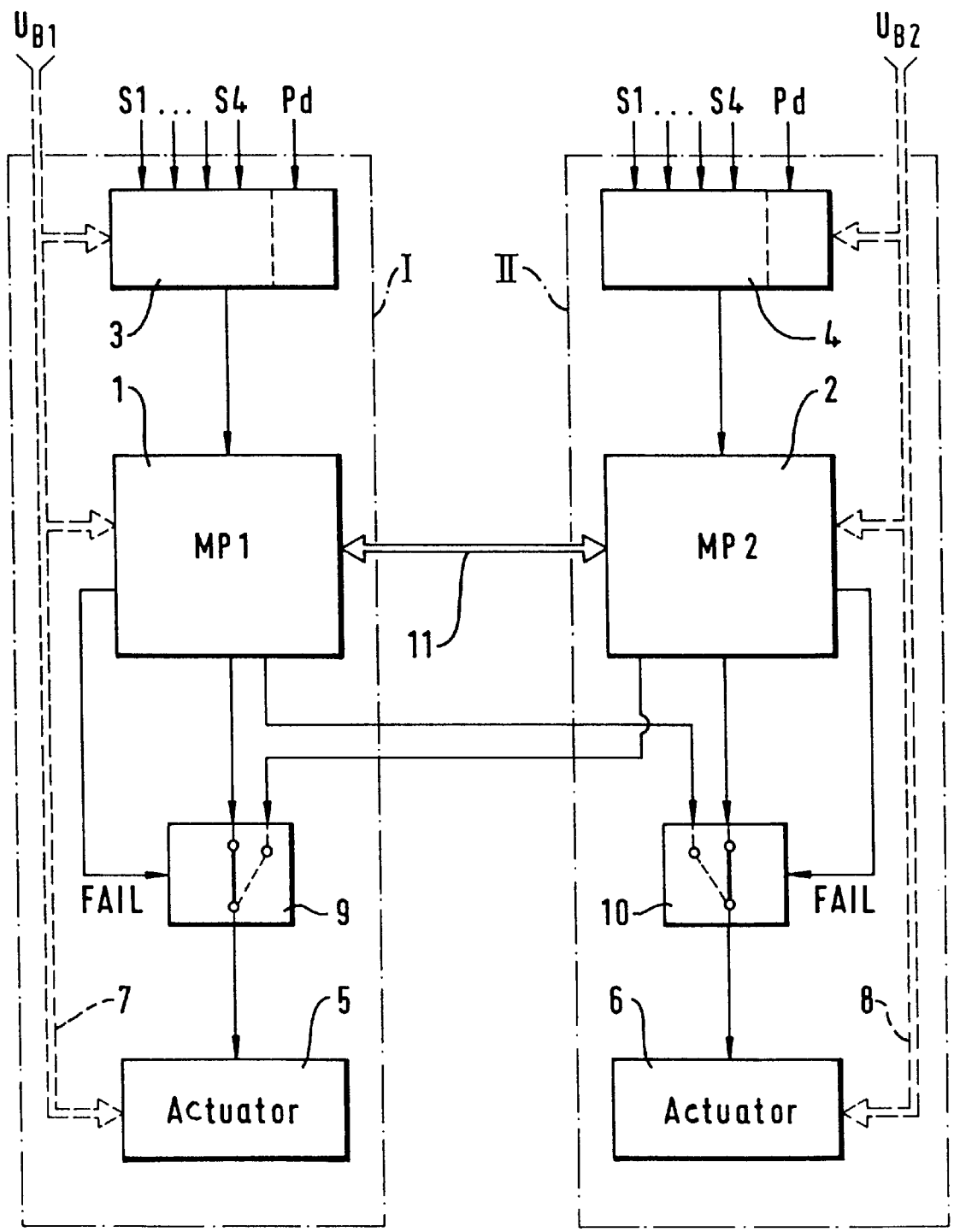

CIRCUIT CONFIGURATION FOR A MOTOR VEHICLE CONTROL SYSTEM

BACKGROUND OF THE INVENTION

The present invention relates to vehicle control systems and more, particularly relates to a circuit arrangement for safety-critical control systems, such as ABS, TCS, ASMS, brake-by-wire, suspension control systems, etc.

TECHNICAL FIELD

Safety-critical control systems of this type include, among others, control systems which intervene into the braking function of an automotive vehicle. These control systems are widely marketed and they are offered in many different designs. Anti-lock systems (ABS), traction slip control systems (TCS), driving stability control systems (DSC, ASMS), suspension control systems, etc., are examples of such systems. Failure of such a control system jeopardizes the driving stability of the vehicle. Therefore, operability of the systems is constantly monitored in order to deactivate the control when a malfunction occurs, or to switch it to a condition which is less dangerous under safety aspects.

Matters are even more critical for brake systems or automotive vehicle control systems where a switch-over to a mechanical or hydraulic system is not possible when the electronics fails. Among those systems are brake system concepts such as 'brake-by-wire' which are likely to increase in popularity. It is imperative for the braking function in systems of this type that the electronics is intact.

German patent No. 32 34 637 discloses an example of a circuit configuration for controlling and monitoring an anti-lock automotive vehicle brake system of the above-mentioned type. With this circuit, the input data of the automotive vehicle control system are processed in parallel and synchronously in two identically programmed microcomputers, in order to recognize proper functioning and the occurrence of errors by comparing the output data of both systems. This is because identical signals must prevail at the outputs of both microcomputers when data processing was executed properly. When an interference or malfunction occurs, i.e., in the event of non-correlation of the output signals, the entire control system is disconnected. The pre-condition of such a procedure, i.e., the complete disconnection of the control when an error occurs, is that the brake system will reliably function, even though without control, after disconnection of the control.

According to another prior art system disclosed in German patent application No. 41 37 124, the input data are also sent in parallel to two microcomputers, only one of which executes the complete sophisticated signal processing operation, however. The main purpose of the second microcomputer is monitoring the input signals can be processed further by way of simplified control algorithms and a simplified control philosophy. The simplified data processing is sufficient to generate signals which indicate the proper operation of the system by comparison with the signals processed in the more sophisticated microcomputer. The use of a test microcomputer of lower capacity permits reducing the manufacturing effort compared to a system with two complete sophisticated microcomputers of identical capacity.

German patent application No. 43 41 082 discloses a microprocessor system which is provided especially for the control system of an anti-lock brake system. The system known from the art which can be incorporated on one single chip comprises two central units in which the input data are processed in parallel. The read-only and the random-access memories which are connected to the two central units have additional memory locations for test information, each comprising a generator to produce the test information. The output signals of one of the two central units are further processed to produce the control signals, while the other central unit, being a passive central unit, is only used to monitor the active central unit.

Finally, a microprocessor system is known from German patent application No. 195 29 434 wherein two synchronously operated central units are provided on one or several chips which have been fed with the same input information and execute the same program. The two central units are connected to the read-only and the random-access memories by way of separate bus systems, as well as to input and output units. The bus systems are interconnected by bypasses which enable both central units to jointly read and execute the data available, including the test data or redundance data, and the commands. This prior art system which is based on redundant data processing renders it possible to economize memory locations which, in turn, reduces manufacturing costs.

All above-mentioned systems are principally based on the comparison of redundantly processed data and the generation of an error signal when differences between the data processing results or intermediate results occur. When an error is detected, that means, upon the occurrence of an error or failure of a system, the control will be deactivated. An emergency operation mode, i.e., continuing the control after the occurrence of the error, is in no case possible because it cannot be identified with the above-described type of error detection which system is still intact. An emergency operation mode on the basis of prior art circuitries as mentioned hereinabove would principally be possible only by doubling the redundant systems in connection with an identification and elimination of the error source.

An object of the present invention is to configure a circuit arrangement which necessitates at most little additional effort compared to the above-described prior art methods and which, nevertheless, initiates an emergency operation mode when an error occurs.

The circuit arrangement of the present invention has a dual-circuit or multiple-circuit design, and each circuit comprises a complete microprocessor system which processes the input data or input information and delivers an error identification signal when an error occurs. There will be a transition to an emergency operation mode upon error identification.

In a preferred aspect of the present invention, the input data of each microprocessor system are redundantly processed in the system and the data-processing results or intermediate results are compared, and the error identification signal is generated in the event of discrepancies between the results.

The circuit arrangement of the present invention can be achieved very simply on the basis of prior art circuits, for example, the prior art systems or circuits described hereinabove which output an error identification signal. It is important that not only the occurrence of an error is signaled but that it is also recognized and identified with the malfunctioning circuit.

According to another aspect of the present invention, each circuit or microprocessor system is only furnished with those input data which are required for the respective circuit. Upon failure of one circuit and transition to the emergency operation mode, the circuit where the error occurred is disabled. The actuators of the respective circuit will no longer be activated. When the example concerns an automotive vehicle brake system with a diagonal brake circuit allotment, it is sufficient to activate the brakes of one circuit in the emergency operation mode. This produces the same situation as in the case of failure of a hydraulic brake circuit of a known dual-circuit brake system with a diagonal circuit allotment.

In an alternative embodiment of the present invention, all input data are sent to each circuit or each microprocessor system directly or by way of communication units which connect the individual microprocessor systems and, upon failure of one circuit, the actuator activation is continued in the emergency operation mode without limitations by connecting the actuator activation to any one of the intact circuits.

Also, it has proven favorable to configure the circuit arrangement of the present invention for a combination of several automotive vehicle control systems such as brake-by-wire, ABS, TCS, ASMS, etc. The emergency operation mode covers either maintaining the operation of all control systems or only maintaining the operation of selected control functions, e.g. functions which are especially critical in terms of safety. It is advantageous when these special functions are assumed by the intact circuits as soon as an error occurs.

BRIEF DESCRIPTION OF THE DRAWING

FIG. 1 is a schematic simplified view exhibiting the most important components of a circuit arrangement of the present invention.

DETAILED DESCRIPTION OF THE PREFERRED EMBODIMENTS

The circuit arrangement shown is basically comprised of two complete circuits I, II, independent of one another, with the microprocessor systems 1, 2 which each also include an input unit 3, 4 taking up and recording input data or input information, as well as an actuator activation unit 5, 6 that evaluates the output signals of the microprocessor systems 1, 2. Another absolutely necessary component part of the circuit arrangement of the present invention is the individual energy supply 7, 8 which is represented herein in dotted double lines as a supply line to the individual components of the two illustrated circuits I, II or microprocessor systems 1, 2.

The circuit arrangement shown is basically comprised of two complete circuits I, II, independent of one another, with the microprocessor systems 1, 2 which each also include a circuit 3, 4 taking up and recording input data or input information, as well as an actuator activation unit 5, 6 that evaluates the output signals of the microprocessor systems 1, 2. Another absolutely necessary component part of the circuit arrangement of the present invention is the individual energy supply 7, 8 which is represented herein in dotted double lines as a supply line to the individual components of the two illustrated circuits I, II or microprocessor systems 1, 2.

The components of the circuit arrangement according to the present invention which together form a circuit I, II are integrated in a dash-dotted frame, as viewed in the drawing. Each circuit I, II includes a complete microprocessor system, including the peripherals. Thus, circuit I comprises the components 1, 3, a commutator 9, and the energy supply 7, while circuit II comprises the components 2, 4, a commutator 10, and the energy supply 8. Appropriately, the two circuits I, II in a brake system are respectively associated with a vehicle diagonal for controlling the brakes.

In an automotive vehicle brake system, the wheel sensors furnish the most important input quantities of the control system. Consequently, the input units 3, 4 are used to record the wheel sensor data. Valves or, in a brake-by-wire concept, electric motors which actuate the individual wheel brakes are suitable as actuators. For the supply with electrical energy, the sources 7, 8 can even be fed from separate vehicle batteries $U_{B1}$, $U_{B2}$ or from separate battery cells.

The signal paths or data paths from the microprocessor systems 1 and 2 to the associated actuator activation unit 5, 6 lead via one commutator 9, 10 each, according to the drawing. The connection between the microprocessor system 1, 2 and the associated actuator activation unit 5, 6 is closed in the inactive position of the commutator. When an error identification signal FAIL appears which is issued by the failing circuit or the microprocessor system I or II in which the error occurs, the commutator 9 or 10 is switched over to its second switch position where the activation of the actuators of the defective circuit I or II is assumed by the intact circuit II or I. When all input data are sent to the intact microprocessor system, the brake application can be continued without restrictions also after switch-over of the commutator 9 or 10 and, thus, transition to the emergency operation mode.

The connections S1 to S4 of the input units 3, 4 represent the inlets for introduction of the wheel sensor data. An inlet Pd is used to receive the brake pedal application data in a brake-by-wire concept.

A definite error identification signal can be generated by comparing the data processing results or intermediate results when a microprocessor system with redundant signal processing is used, as is known in the art. There is no longer a correlation when an error exists. This signal is evaluated according to the present invention and causes switch-over to the emergency operation mode.

The microprocessor systems 1, 2 pertaining to the circuits I, II are interconnected by a communication unit 11. There is a data exchange via this path which ensures that all input data and also intermediate results of data processing can be processed and evaluated in both microprocessor systems 1, 2. Also, many different monitoring measures may be executed in a known fashion by way of this communication unit 11.

A major advantage of the circuit arrangement of the present invention is that it has two identical circuits I, II with redundant data processing. Each circuit I or II can be employed for a control system where a mechanic or hydraulic emergency operation mode is initiated in the case of an error upon deactivation of the electronics or the actuator activation. In the embodiment of the present invention described which exhibits an electrical dual-circuit system I, II, either circuit I or II is disconnected, or the actuator activation of this circuit is taken over by the intact circuit when an error occurs. Both measures lead to an emergency operation mode. The result of the first measure is an emergency operation mode where an extended stopping distance, etc., is tolerated, while the second measure maintains the braking function without restrictions and impairs only the reliability in operation upon the (relatively unlikely) occurrence of further errors, thus, reducing the safety standard.

It is basically also possible to restrict the take-over of the actuator activation as a consequence of error detection to control functions which are especially critical. This is appropriate in particular when the circuit arrangement described comprises a combination of several safety-critical and less safety-critical control systems or control functions. In this case, at least a conventional or standard braking function should be ensured during the emergency operation.

Error detection and identification of the error source or the location of the error is a precondition of the activation of the commutators 9, 10 which can be realized by hardware and by software also. It is basically possible to make the switchover dependent on a majority decision when data processing is effected on more than two (redundant) paths. In the embodiment described, data are processed redundantly in each of the two microprocessor systems 1, 2 so that each system is able to detect and signal errors on its own. It is sufficient to know in which circuit or microprocessor system the error occurs.

What is claimed is:

1. A circuit arrangement for use with an automotive vehicle control system for controlling safety-critical control operations, said circuit arrangement processing input data from the control system and generating an error identification signal when a discrepancy occurs, said circuit arrangement comprising:

first and second microprocessor systems for redundantly processing input signals and for generating an error identification signal in the event of a discrepancy between the redundantly processed input signals; and means for transitioning the control system to an emergency operation mode when a discrepancy occurs in one of said first and second microprocessor systems, wherein said transitioning means comprises a first commutator for transitioning the control system from said first microprocessor system to said second microprocessor system when the discrepancy occurs in said first microprocessor system, and a second commutator for transitioning the control system from said second microprocessor system to said first microprocessor system when the discrepancy occurs in said second microprocessor system.

2. The circuit arrangement according to claim 1, further including first and second input units for providing input data to said first and second microprocessor systems, respectively.

3. The circuit arrangement according to claim 1, wherein said first commutator includes first and second switch positions, the control system being transitioned from said first microprocessor system to said second microprocessor system when said first communtator is positioned in said second switch position, and wherein said second commutator includes first and second switch positions, the control system being transitioned from said second microprocessor system to said first microprocessor system when said second communtator is positioned in said second switch position.

4. A dual circuit arrangement for use with an automotive vehicle control system for controlling safety-critical control operations, comprising:

a first circuit comprising a first input unit for receiving input data, a first microprocessor for receiving and processing the input data from said first input unit, a first commutator for receiving a signal from said first microprocessor, and a first actuation unit for receiving a signal from said first commutator; and a second circuit comprising a second input unit for receiving input data, a second microprocessor for receiving and redundantly processing the input data from said second input unit, a second commutator for receiving a signal from said second microprocessor, and a second actuation unit for receiving a signal from said second commutator, wherein one of said first and second circuits generates an error identification signal when a discrepancy occurs in one of said first and second microprocessors, wherein the first commutator transitions the control system from said first microprocessor to said second microprocessor when the discrepancy occurs in said first microprocessor, and wherein the second commutator transitions the control system from said second microprocessor to said first microprocessor when the discrepancy occurs in said second microprocessor.

5. The circuit arrangement according to claim 4, wherein said first commutator includes first and second switch positions, the control system being transitioned from said first microprocessor to said second microprocessor when said first communtator is positioned in said second switch position, and wherein said second commutator includes first and second switch positions, the control system being transitioned from said second microprocessor to said first microprocessor when said second communtator is positioned in said second switch position.

6. The dual circuit arrangement according to claim 4, wherein the first actuation unit isolates the control system from said first microprocessor when the discrepancy occurs in said first microprocessor, and wherein the second actuation unit isolates the control system from said second microprocessor when the discrepancy occurs in said second microprocessor.

7. A method of controlling safety-critical control operations of an automotive vehicle control system by use of a dual circuit arrangement, the dual circuit arrangement including a first circuit comprising a first input unit for receiving input data, a first microprocessor for receiving the input data from said first input unit, a first commutator for receiving a signal from said first microprocessor, and a first actuation unit for receiving a signal from said first commutator, and a second circuit comprising a second input unit for receiving input data, a second microprocessor for receiving the input data from said second input unit, a second commutator for receiving a signal from said second microprocessor, and a second actuation unit for receiving a signal from said second commutator, the method comprising the steps of:

processing the input data in the first microprocessor;

redundantly processing the input data in a second microprocessor; and generating an error identification signal when a discrepancy occurs in one of said first and second microprocessor; and transitioning the control system from said first circuit to said second circuit when the discrepancy occurs in said first microprocessor by switching said first commutator from a first position to a second position; and transitioning the control system from said second circuit to said first circuit when the discrepancy occurs in said second microprocessor by switching said second commutator from a first position to a second position.

8. The method according to claim 7, wherein said first actuation unit isolates the control system from said first circuit when the discrepancy occurs in said first microprocessor, and wherein said second actuation unit isolates the control system from said second circuit when the discrepancy occurs in said second microprocessor.

* * * * *